US012269676B2

(12) United States Patent
Russo et al.

(10) Patent No.: US 12,269,676 B2
(45) Date of Patent: Apr. 8, 2025

(54) INSTRUMENT FOR THE COLLECTION OF ORGANIC WASTE

(71) Applicant: 16EMEZZO SRL, Milan (IT)

(72) Inventors: Alessandro Russo, Milan (IT); Luigi Felice, Milan (IT)

(73) Assignee: 16EMEZZO SRL, Milan (IT)

( * ) Notice: Subject to any disclaimer, the term of this patent is extended or adjusted under 35 U.S.C. 154(b) by 297 days.

(21) Appl. No.: 17/624,360

(22) PCT Filed: Jul. 22, 2020

(86) PCT No.: PCT/IB2020/056873
§ 371 (c)(1),
(2) Date: Jan. 3, 2022

(87) PCT Pub. No.: WO2021/014364
PCT Pub. Date: Jan. 28, 2021

(65) Prior Publication Data

US 2022/0356010 A1 Nov. 10, 2022

(30) Foreign Application Priority Data

Jul. 24, 2019 (IT) ........................ 102019000012825

(51) Int. Cl.
*B65F 1/06* (2006.01)
*B65F 1/14* (2006.01)

(52) U.S. Cl.
CPC .............. *B65F 1/06* (2013.01); *B65F 1/1415* (2013.01); *B65F 2210/168* (2013.01); *B65F 2210/188* (2013.01)

(58) Field of Classification Search
CPC .......... B65F 2210/168; B65F 2210/188; B65F 1/06; B65F 1/1415

(Continued)

(56) References Cited

U.S. PATENT DOCUMENTS 4,765,579 A * 8/1988 Robbins, III ............. B65F 1/06 248/101
5,143,242 A 9/1992 Millasich
(Continued)

FOREIGN PATENT DOCUMENTS

EP 2589487 A1 5/2013
WO 2013/005236 A1 1/2013
WO WO2013005236 * 1/2013 ................ B65F 1/06

OTHER PUBLICATIONS

International Search Report of PCT/IB202/056873 Mailed on Jan. 21, 2021.

*Primary Examiner* — Don M Anderson
*Assistant Examiner* — Elizabeth J Volz
(74) *Attorney, Agent, or Firm* — Rivka Friedman

(57) ABSTRACT

An instrument is described for collecting domestic organic waste comprising:
- an external container forming a cavity with an inner surface,
- a lid for hermetically closing the cavity of the container,
- a device for decreasing the pressure inside the container by extracting air from the cavity,
- an inner bag located inside the cavity to contain organic waste,
- a protruding element comprising a portion which is spaced and cantilevered from the inner surface and configured to support the bag inside the container suspending it inside the cavity in order to avoid pressure difference between inside and outside of the bag.

7 Claims, 3 Drawing Sheets

(58) Field of Classification Search
USPC ................................ 220/495.06, 908, 908.1
See application file for complete search history.

(56) References Cited

U.S. PATENT DOCUMENTS

| | | | | |
|---|---|---|---|---|
| 5,971,194 | A | 10/1999 | Freedland | |
| 6,250,492 | B1 * | 6/2001 | Verbeek | B65F 1/06 220/495.11 |
| 7,543,716 | B2 * | 6/2009 | Lin | B65F 1/163 220/495.11 |
| 2005/0150893 | A1 | 7/2005 | Kuo | |

* cited by examiner

INSTRUMENT FOR THE COLLECTION OF ORGANIC WASTE

The invention relates to an instrument for collecting organic waste, in particular domestic waste.

For household waste small-sized biodegradable bags are used which do not manage to contain waste produced in more than 2 or 3 days because the waste perishes and stinks. Desiring to collect and store waste for a period longer than 2 or 3 days, it is necessary to find solutions suitable for large containers or to use bags of different sizes already on the market and normally already in use by consumers.

WO2017109806 discloses an advantageous depressurizable bin with inside a second container to support and hold a biodegradable bag in such a way as to avoid a destructive pressure difference between the outside and inside of the bag which otherwise would suck the bag towards the air intake channel and which would prove destructive to the bag itself.

WO2017109806 can be improved to facilitate the support of the bags, to hold bags or containers of different sizes and hold multiple bags already filled.

Improving this state of the art is the main object of the invention, which is defined in the attached claims, in which the dependent claims define advantageous variants.

An instrument is proposed to collect organic waste, in particular household waste, comprising:

an internal container forming a cavity with an inner surface, a lid to hermetically close the cavity of the first container, a device (e.g. a pump or a fan) to decrease the pressure inside the container by extracting air from the cavity, an element protruding cantilevered from the inner surface, an internal bag, placed inside the cavity to contain organic waste, wherein the protruding element comprises a portion that is spaced from the inner surface and configured to support the bag inside the container.

The protruding element advantageously allows to accommodate in the container a bag of various sizes.

The bag may be of the biodegradable type. Especially in this case it could happen that the bag is sucked towards the air intake channel due to the pressure difference between the inside and outside of the bag, and/or breaks because of the depressurization caused inside the container. To avoid this problem, the instrument comprises means for putting into air communication the portion of the inner volume of the container that—in use—is above the protruding element (e.g. a portion close to the lid) with the portion of the inner volume of the container that—in use—is under the protruding element (e.g. a portion near the bottom of the first container).

The means for putting into air communication are for example:

a duct, internal or external to the container, which opens into said first and second portion of the container, or slots between the protruding element and the inner surface of the container (e.g. resulting from tolerances of the pieces or created specifically) or the means are placed on the protruding element, e.g. as pass-through openings that cross from side to side the thickness of the protruding element. Note that this expedient can avoid the use of a second rigid container as in WO2017109806 to support a bag.

Furthermore if the bag, to be supported, is positioned on the edge of the container, it is inevitably broken not only by the pressure difference between the inside and outside of the bag itself but also by the pressure of the lid on the supporting edge. Such pressure can reach and exceed even 40 kg/cm$^2$ on the edge of the perimeter of the container which is a few cm$^2$.

The protruding element comprises a portion that is spaced from the inner surface, protruding cantilevered from it, and configured to support the bag inside the container by suspending the bag inside the container's cavity.

The protruding element may be in one piece with the container or a separate piece and detachably connectable to the container, e.g. laid.

In a preferred variant, the inner surface of the container's cavity is configured to form a support for the protruding element to prevent it from falling because of gravity. E.g. the inner surface of the container's cavity has one or more reliefs, such as teeth or fins, on which to rest the protruding element. In a more preferred variant, the container's cavity has a conical shape which tapers towards a ground supporting base (when in use) of the container, so that the narrowing of the cavity section downwards (in use) allows resting the protruding element on the inner surface of the cavity without it falling.

In a preferred variant, the protruding element comprises a ring of shape complementary to the internal perimeter of the cavity, wherein said spaced portion corresponds to an inner crown (with a smaller radius) of the ring. In particular, the ring comprises a peripheral edge to rest on a corresponding shoulder formed on the inner surface of the container, e.g. a step.

Preferably the protruding element is equipped with holes to allow the passage of air between the top and the bottom of the container, in order to circulate the air and avoid creating a pressure difference between the inside and outside of the bag. Or the air can pass through a duct, external to the container, which puts into communication the top and bottom part of the container.

Preferably the protruding element is formed by the combination of two or more concentric and radially decreasing sized parts (e.g. rings) configured to fit on each other. In this way there is the advantage of being able to attach bags of different sizes.

E.g. the protruding element is structured in such a way as to be able to place a bag on said dimensionally suitable part and then block it with fastening means, e.g. hooks or pliers.

Preferably the container comprises a double bottom, in order to be able to contain therein e.g. one or more containers already full of waste or to house components of the instrument.

Preferably, said device is contained in the lid or in a compartment located on the side or bottom of the container.

Preferably the instrument comprises a sprayer for spraying an enzymatic liquid adapted to slow down the bacterial proliferation of the waste and therefore to slow down further the process of decomposition of the waste itself. The sprayer may be housed in a compartment in the lid or in the side of the external container.

Preferably the sprayer is connected to an enzyme tank placed inside or outside a compartment of the lid, or placed inside or outside the container.

Preferably the sprayer is connected to a pump configured to pump fluid from the enzyme yank to a nozzle, preferably located at the bottom of the lid and facing the container's cavity.

Note that the advantages and effects of the sprayer can also be exploited in a waste container other than that defined above.

Preferably the instrument comprises, in the lid or in the inner sides of the container, a UV light lamp or source to emit UV rays. So one can break down the bacterial proliferation of the waste and thus further slow down the waste decomposition process.

The UV source may be placed inside the lid and/or on the internal sides of the container and/or on the inner bottom of the container.

The UV light source is directed towards the waste contained in the container to avoid that, by hitting the bag, it will be damaged.

The frequency of the UV light source will preferably be between 100 and 280 nm, to avoid possibly damaging the biodegradable bag.

Preferably, the UV source for safety is controlled to turn off when the lid is opened. The operation of the UV source may be continuous or intermittent.

Note that the advantages and effects of the UV light source can also be exploited in a waste container other than that defined above.

Preferably, the instrument comprises a (e.g. active carbon) filter associated with said device to reduce the odor perception of the waste itself.

The lid should be well centered in order to maintain a perfect hermetic seal between the outside and inside of the container and keep the internal depressurization thereof. Preferably then the instrument comprises centering means for the closing of the lid onto the container. In particular, said means comprise a pin supported at the center of the cavity and a magnet placed at the center of the lid configured to engage each other.

Preferably the drive to centering is obtained through the pin that can be inserted into an inverted-cone-shaped recess obtained at the center of the bottom of the lid. The magnet, with its attractive force on the pin, will help and facilitate centering and the correct positioning.

Preferably the instrument comprises a sensor for monitoring the status of the centering and/or closing of the lid. The sensor e.g. emits an electrical signal detected by an electronic circuit that controls the device, the electronic circuit being configured to start the air suction process from inside the container only after it has received the signal. Note that the aforementioned magnet can also have the function of said sensor to monitor the centering and/or closing status of the lid.

Preferably, the electronic circuit also drives the sprayer and/or the UV light lamp or source.

Preferably the bottom part of the lid, the one configured to make contact with the container, comprises an annular portion made of rubbery and/or elastically deformable material, and of such shape as to act as a seal.

In a different variant, the lid comprises a membrane (e.g. in rubbery and/or flexible material) which extends to form the outer surface of a major base of the lid, corresponding in use to the lower part of the lid that rests on the edges of the cavity of the first container. In this variant the "gasket" function is replaced by the part of the bottom of the lid in contact with the edge of the container. In this way the bottom of the lid and the gasket are a single body. Another advantage is that the membrane can deform favoring the sealing with the container.

The aforesaid annular portion or membrane gives the advantage that it can deform during the depressurization and such deformation allows a thrust of the annular portion or membrane on the edge of the container, thereby facilitating the closing and above all ensuring greater sealing than a flat gasket.

The annular portion or membrane guarantees a mechanical deformation towards the inside of the container as a consequence of the pressure difference generated upon extraction of the air. This deformation results in a mechanical effect of pressure of the membrane against the inner edges of the container generating airtight sealing.

Preferably said device, or the valve and the electronic board, are placed inside the lid and anchored to said membrane, with the advantage of reducing vibrations and noise.

The advantages of the invention will be even clearer from the following description of a preferred example of instrument, referring to the attached drawing in which FIG. 1 shows a three-dimensional view of a waste bin;

In the figures same numbers indicate identical or conceptually similar parts, and the elements are described as being in use. In order not to crowd the figures, some reference numbers are omitted.

Figure 1:
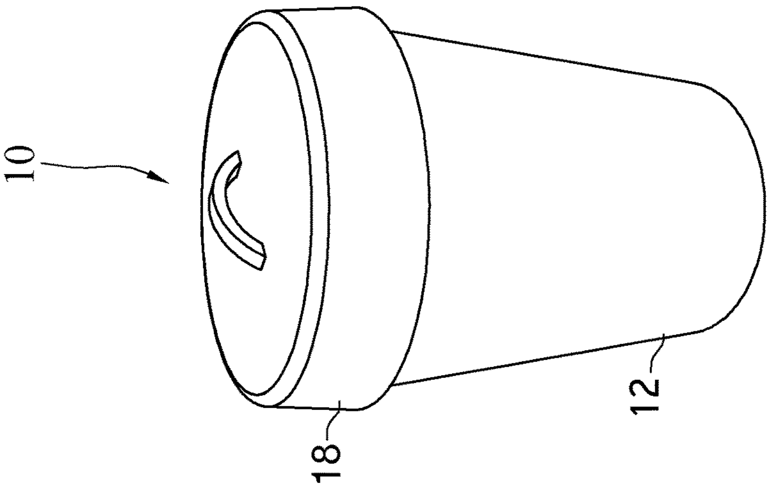

FIG. 1 shows a bin or receptacle 10 comprising an external circular-plan container 12 which delimits a cavity 14 with an inner surface 16, a lid 18 constructed to hermetically close the cavity 14 and an internal bag 20, placed inside the cavity 14 to contain organic waste.

The bag 20 is supported within—and spaced from—the cavity 14 by means of a support element protruding from the inner surface 16. The protruding element may be integrated with—and integral with—the inner surface 16, or permanently fixed to the inner surface 16, or only laid on the inner surface 16 and maintaining the vertical position thanks to a preferred taper of the surface 16.

The protruding element is configured to allow air circulation between the lower part and the upper part of the container 12, so as to avoid a pressure difference between the inside and outside of the bag 20. In particular, the protruding element is preferably provided with holes (not shown) to allow the passage of air between the upper part and the lower part of the cavity 16, in order to avoid pressure difference between the inside and the outside of the bag 20 when it is depressurized.

A device (not shown, e.g. a pump or fan) is mounted inside the bin 10 to decrease the pressure inside the container 12 by extracting air from the cavity 14 when the latter is hermetically closed by the lid 18.

The protruding element has as a preferred embodiment a ring 40 (see FIGS. 4 and 5) with different circular corrugations 42 to which bags of different sizes can be fixed, e.g. with hooks, pegs or clamps (not shown).

Figure 4:
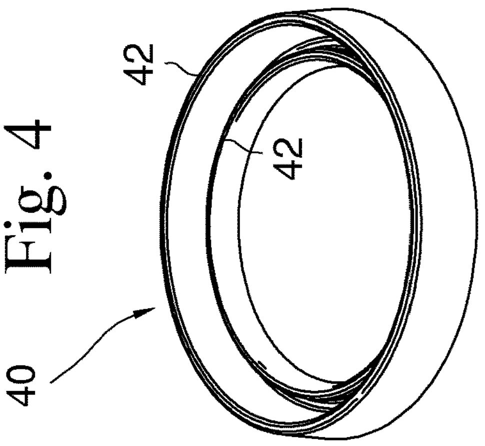
FIG. 4 shows a three-dimensional view of an internal component of the bin of FIG. 3.
Figure 5:
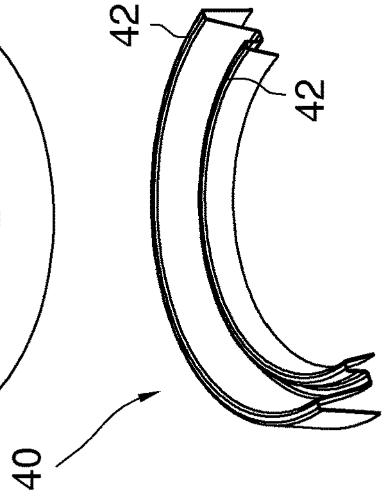
FIG. 5 shows a sectional three-dimensional view of the component of FIG. 4.
Figure 6:
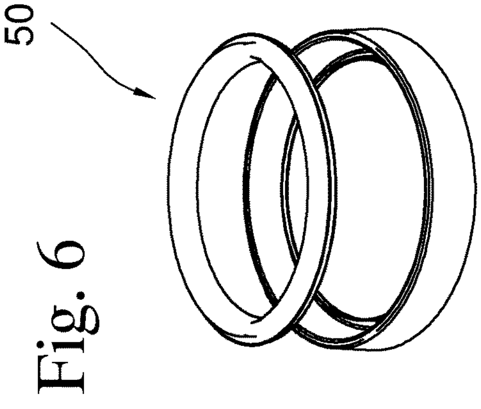
FIG. 6 shows a three-dimensional view of a variant of internal component for the bin with respect to FIG. 4.
Figure 7:
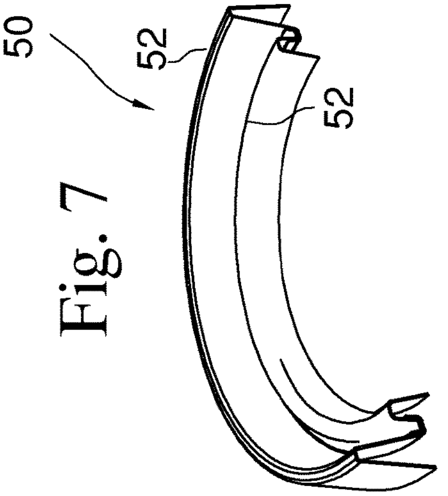
FIG. 7 shows a three-dimensional cross-sectional view of the component of FIG. 6 in assembled configuration.
Figure 8:
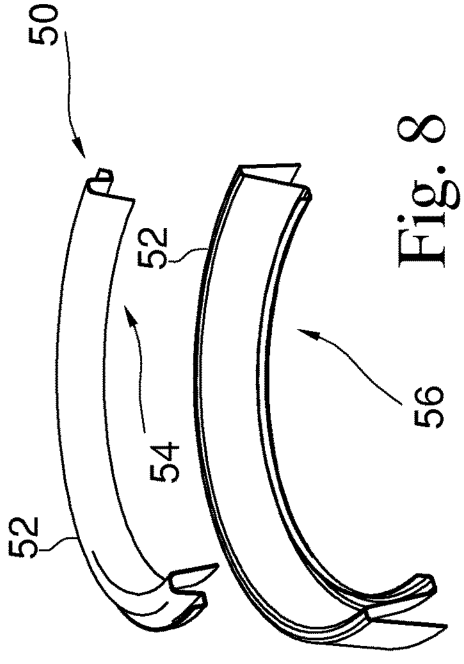
FIG. 8 shows a three-dimensional cross-sectional view of the component of FIG. 6 in disassembled configuration.

Another preferred construction for the protruding element of FIG. 4 is shown in FIGS. 6-8. In this case the protruding element is formed by a ring 50 with different circular corrugations 52 (functionally identical to corrugations 42). The ring 50 is here altogether the combination or superposition of two or more concentric and decreasing-sized parts 54, 56 configured to fit together. The parts 54, 56 are e.g. rings or arches each having an annular portion complementary to an annular portion of the other, so that an annular portion of one part can be wedged on and within an annular portion of the other, so as to form an overall ring with a larger outer radius and smaller inner radius.

The two parts 54, 56 may also be used to clamp the bag between the respective annular portions.

Figure 9:
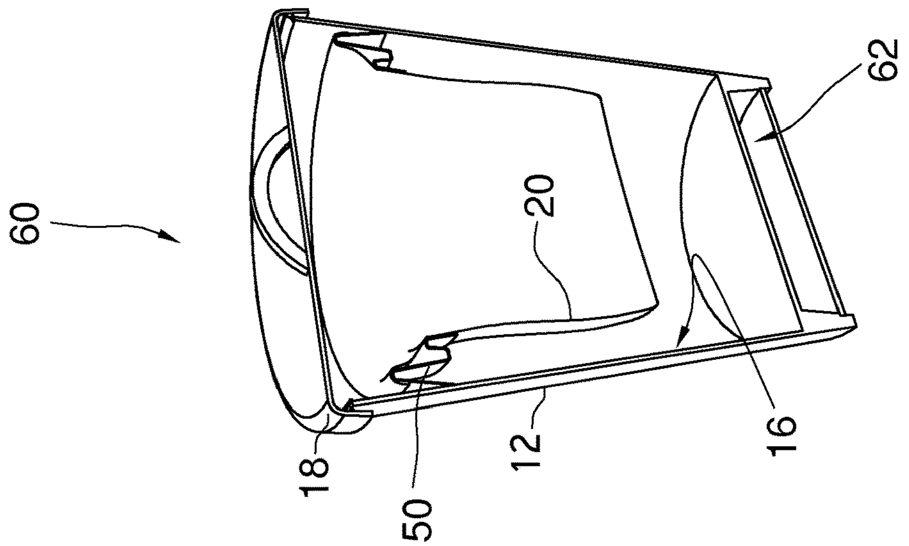
FIG. 9 shows a cut-away three-dimensional view of a variant of the bin in FIG. 1.

The internal structure of the bin can be modified to increase its functionality. E.g. FIG. 9 shows a variant 60 of a bin that implements a double bottom or a lower compartment 62 in which to contain bags full of waste and/or internal functional components of the bin, e.g. the pump or electronics. FIG. 9 shows a variant of bin 60 which contains a bag 66 (as in FIG. 3). In general, one can implement a double bottom or a lower compartment 62 in any illustrated embodiment.

Figure 11:
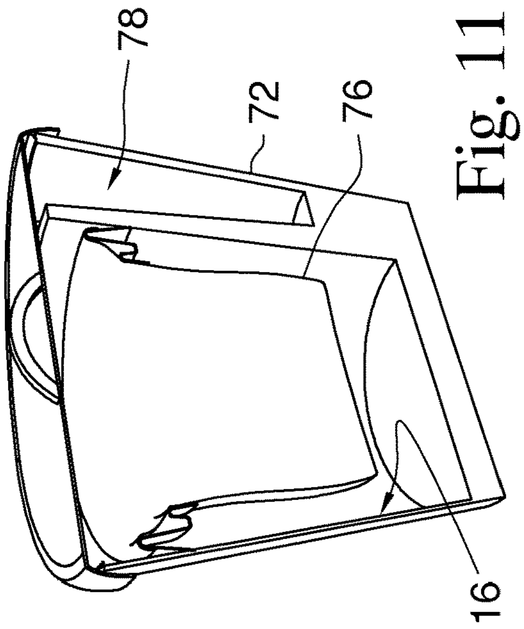
FIG. 11 shows a three-dimensional cut-away view of the bin of FIG. 10.
Figure 10:
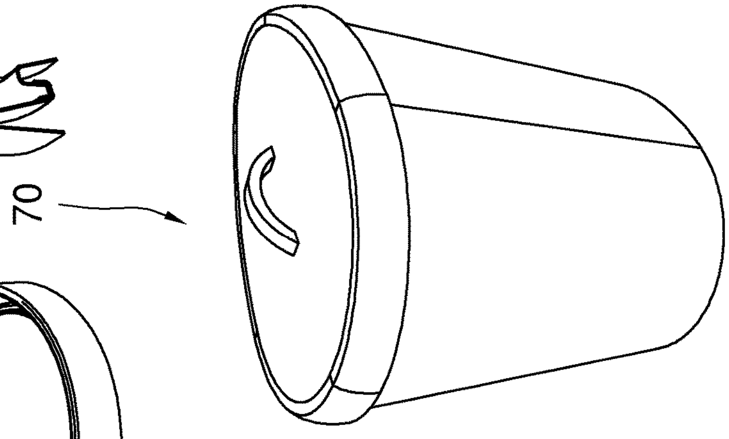
FIG. 10 shows a three-dimensional view of a variant of the bin of FIG. 1.

The bin may have an internal and/or external container with a plan different from circular. In FIGS. 10-11 e.g. there are shown variants 70 of bin with an external container 72 which has an oval plan.

Figure 3:
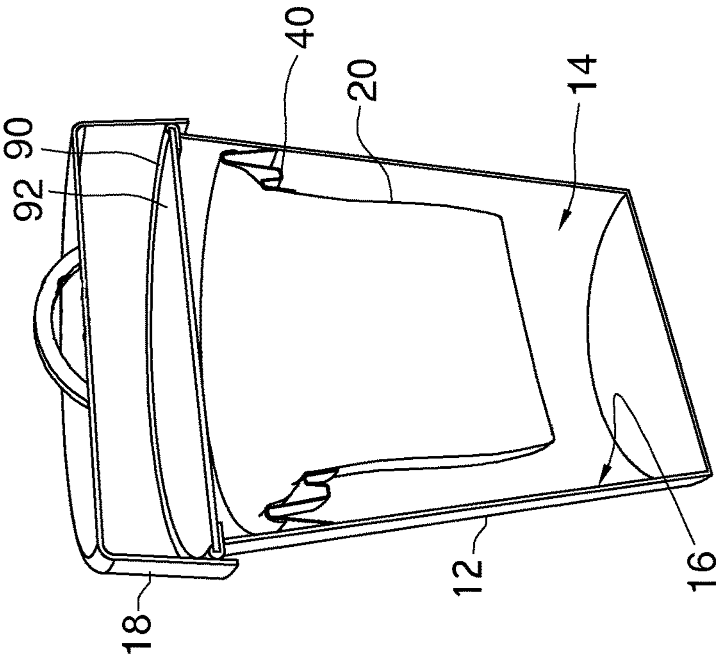
FIG. 3 shows a cut-away three-dimensional view of a variant of the bin of FIG. 1.

FIGS. 10-11 show a variant of bin 70 which contains a bag 76 (as in FIG. 3).

It is noted that the non-circular plan allows obtaining a second cavity 78 inside the container 72. The cavity 78 can be isolated from the cavity 14 and used for storing enclosed waste and/or functional components (like the compartment 62).

In general, one can implement the non-circular plan in any illustrated embodiment.

Figure 2:
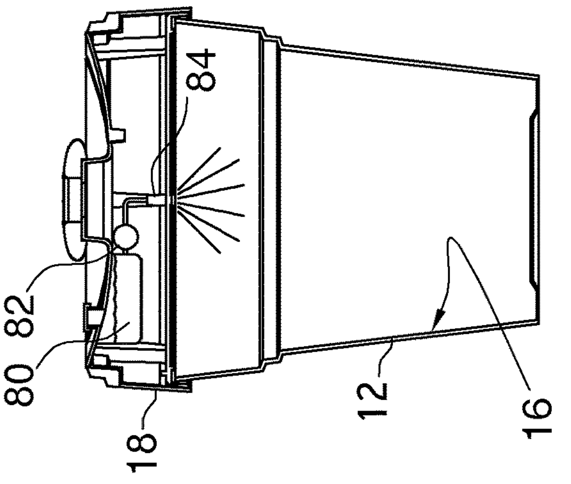
FIG. 2 shows a three-dimensional vertical cross-sectional view of a variant of the bin of FIG. 1.
Figure 12:
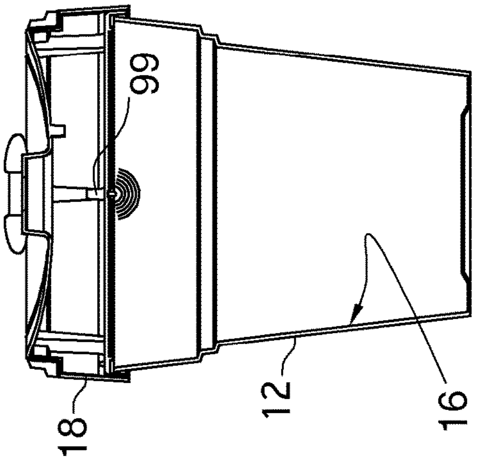
FIG. 12 shows a three-dimensional vertical cross-sectional view of a variant of the bin of FIG. 1.

FIGS. 2 and 12 show an example of how the lid 18 can optionally be internally equipped to give additional functionality to the bin.

In the variant of FIG. 2, in the lid 18 there is a tank 80 of enzymes from which a pump 82 can draw to spray enzymes into the container 12 via a nozzle 84 which opens in the bottom of the lid 18.

In the variant of FIG. 12, on the bottom of the lid 18 there is a source 99 of UV rays, which can irradiate the cavity 14 to sanitize it.

In general, the enzyme sprayer and/or the UV ray source may be implemented in each illustrated embodiment.

FIG. 3 also shows an example of a variant for the lid 18, which can be equipped to give additional functionality to the bin.

The lid 18 forms a recess in which to secure the edges of the outer container 12. On the edges of the recess there is a ring 90 which supports a membrane 92 arranged flat to occupy a flat surface contained between the edges of the recess. The membrane 92 is preferably made of flexible material, e.g. rubber.

When depressurization is created inside the container 12, the membrane 92 is lightly sucked insider the container 12 pressing its external perimeter and/or the ring 90 against the edges of the container 12. In this way the air-tightness of the container 12 improves.

The membrane-equipped bottom may be added to—or removed from—the bin's lid, regardless of the remaining structure of the bin or its components. E.g. note that the lid of FIG. 11 is not equipped with the membrane.

All mechanical or electrical components inside the bin are preferably controlled by an electronic board and/or processor mounted inside the bin, e.g. inside the lid or in a lower compartment of the outer container.

The invention claimed is:

1. Instrument for collecting domestic organic waste comprising:
- an external container having an inner volume and forming a cavity with an inner surface,
- a lid for hermetically closing the cavity of the container,
- a device for decreasing the pressure inside the container by extracting air from the cavity,
- an internal bag located inside the cavity to contain organic waste,
- a protruding element comprising a portion which is spaced and immovably cantilevered from the inner surface and configured to support the bag inside the container, suspending it inside the cavity, the inner volume of the container that is above the protruding element being a first portion of the inner volume, and the inner volume of the container which is below the protruding element being a second portion of the inner volume, and
- means for putting said first portion into air communication with said second portion for avoiding a pressure difference between the inside and outside of the bag.

2. Instrument according to claim 1, wherein said means comprises
- a duct, placed inside or outside the container, which opens into said first and second portion of the inner volume of the container, and/or
- slots between the protruding element and the inner surface of the container, and/or
- pass-through openings that cross the thickness of the protruding element from side to side.

3. Instrument according to claim 1, wherein the protruding element comprises a ring with a shape complementary to the internal perimeter of the cavity.

4. Instrument according to claim 1, wherein the protruding element is formed by the combination of two or more concentric and radially decreasing sized parts configured to fit on each other.

5. Instrument according to claim 4, wherein said concentric and radially decreasing sized parts are rings.

6. Instrument according to claim 1, wherein said device is contained in the lid or in a compartment on the side or bottom of the container.

7. Instrument according to claim 1, wherein said protruding element forms a ring.

* * * * *